Dec. 26, 1939.  F. M. ALLEN  2,184,970
FLEXIBLE SMOOTH SURFACE RUG AND METHOD OF MAKING SAME
Filed May 31, 1939   3 Sheets-Sheet 1
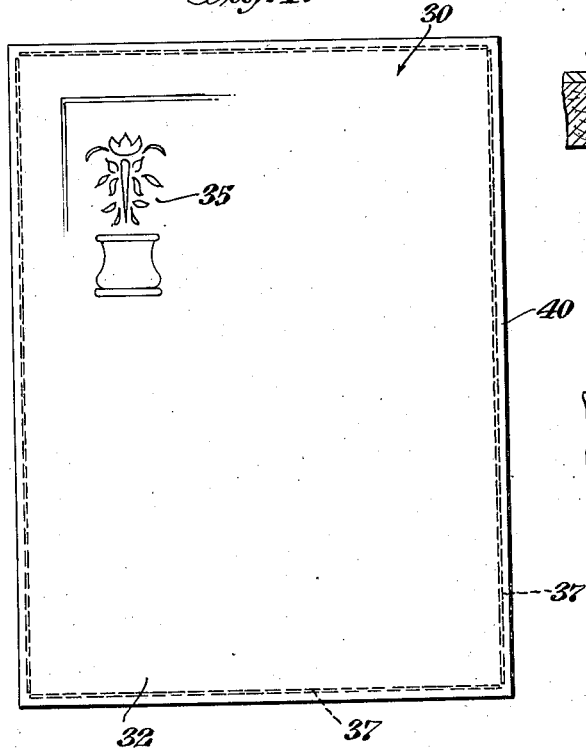
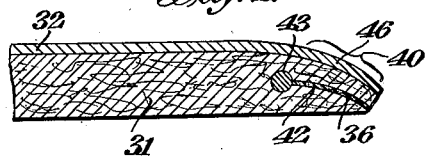
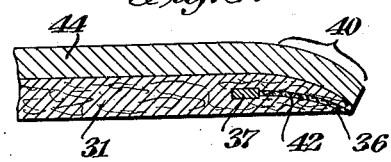
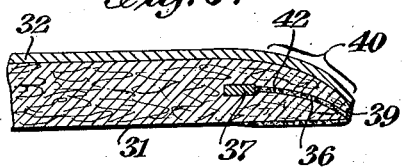
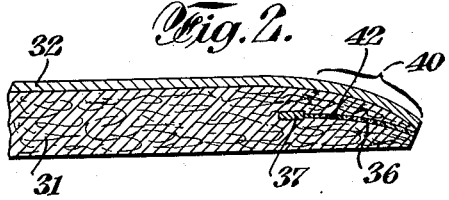
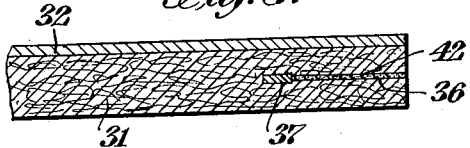
INVENTOR
FRANK M. ALLEN
BY
Gordon C. Willard
ATTORNEY Dec. 26, 1939.　　　F. M. ALLEN　　　2,184,970
FLEXIBLE SMOOTH SURFACE RUG AND METHOD OF MAKING SAME
Filed May 31, 1939　　　3 Sheets-Sheet 2
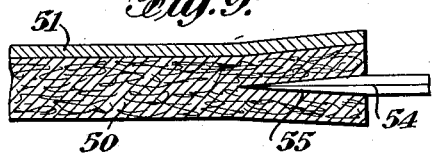
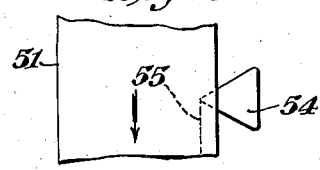
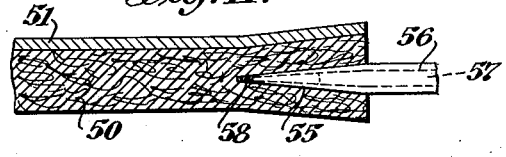
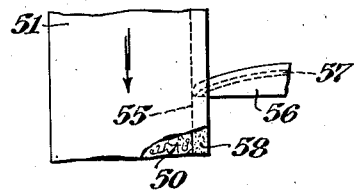
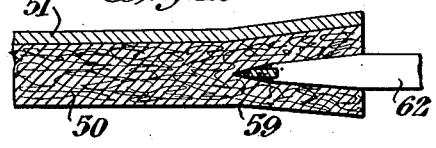
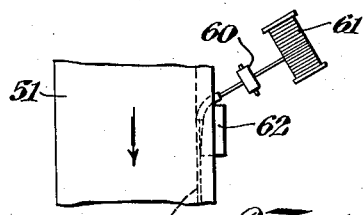
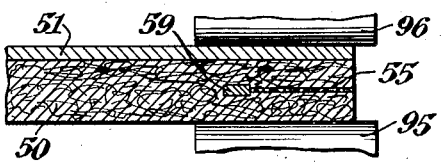
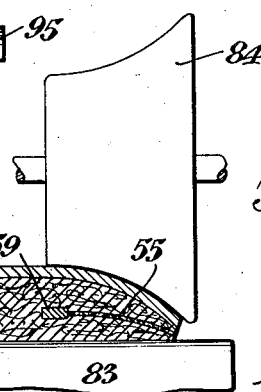
INVENTOR
FRANK M. ALLEN
BY
Gordon C. Willard
ATTORNEY Dec. 26, 1939.   F. M. ALLEN   2,184,970
FLEXIBLE SMOOTH SURFACE RUG AND METHOD OF MAKING SAME
Filed May 31, 1939   3 Sheets-Sheet 3
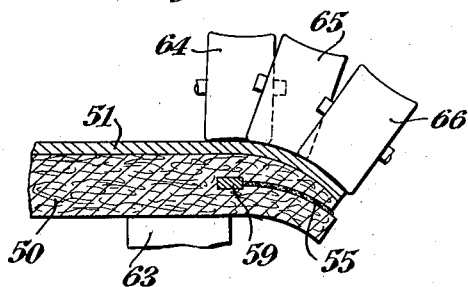
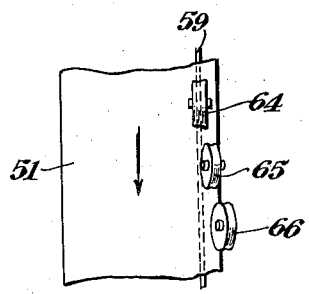
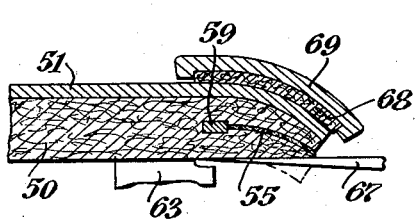
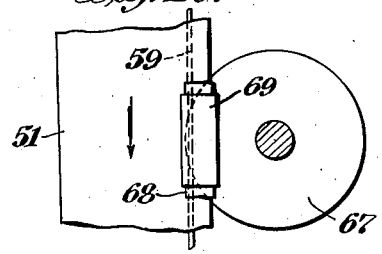
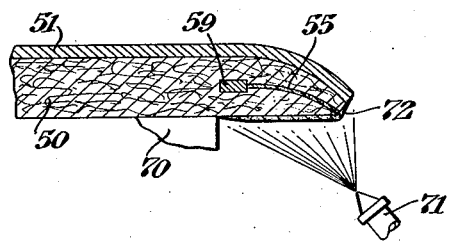
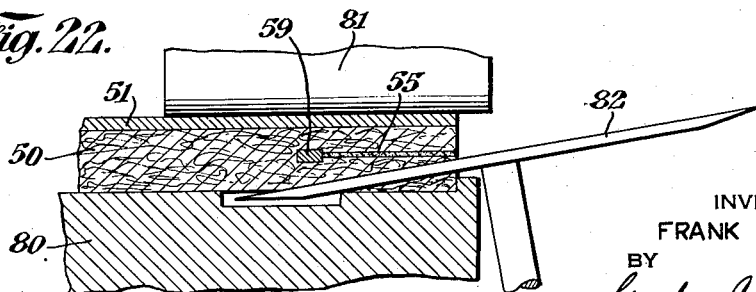
INVENTOR
FRANK M. ALLEN
BY
Gordon C. Willard
ATTORNEY Patented Dec. 26, 1939

2,184,970

UNITED STATES PATENT OFFICE 2,184,970

FLEXIBLE SMOOTH SURFACE RUG AND METHOD OF MAKING SAME

Frank M. Allen, Summit, N. J., assignor to Congoleum-Nairn Inc., a corporation of New York Application May 31, 1939, Serial No. 276,626

19 Claims. (Cl. 154—2)

This invention relates to flexible smooth-surface rugs and to method of making such rugs. This invention relates particularly to flexible smooth-surface rugs having a base sheet comprising a fibrous material impregnated with waterproofing material and suitable for covering a subsurface such as the surface of a floor. This application is a continuation in part of my application Serial No. 99,168 filed September 2, 1936, for Flexible smooth surface rugs and method of making same.

A type of flexible smooth-surface rug which has been extensively manufactured and sold in connection with which this invention may be advantageously illustrated, includes a base sheet consisting of water-laid felt of some suitable fiber such as rag fiber or the like impregnated with a suitable material which is adapted to increase the water-resistance and strain-resistance of the felt, such as a bituminous saturant having a melting point of about 160° F. To one surface of the waterproofed felt base sheet there is applied a sealing coat which is adapted to resist bleeding of the saturant in the base sheet therethrough and which may, for example, comprise a suitable vehicle such as a drying oil or resin, or both, together with a filler. Over the sealing coat a surface coating or layer of wear-resistant and decorative material is applied. This coating or layer may comprise a suitable binder material such as a drying oil, or a soluble cellulose derivative, or a resinous material, together with solid material in the nature of finely-divided pigment or inert filler or both. This surface layer is usually applied in the form of paints of different color by means of a printing operation adapted to produce the desired surface design. While the surface of such a rug is referred to as "smooth", the term "smooth-surface" is used to distinguish from rugs comprising heavy pile fabrics, for example, and may include rugs having a surface layer of coating or molded composition which contains irregularities in the surface. Suitable decorative and wear-resistant coatings may, for example, comprise drying oil paint or enamel, cellulose ester lacquer, synthetic resin lacquer or molded composition, linoleum composition, or the like. Both the sealing coat and the surface coating or layer can be applied in one or more applications. The back of the rug is usually treated with some suitable protective composition such as the composition used for the sealing coat in order to render the back of the rug non-sticky and more attractive in appearance.

It is a purpose of this invention to improve upon flexible smooth-surface rugs such as the bituminized felt base rug above referred to by improving the resistance of the marginal portion thereof to injury and at the same time in preferred modifications of this invention by improving upon the appearance of the rug along the margin thereof. It is also a purpose of this invention to afford a novel and useful method whereby the aforesaid improvements in the marginal portion of the rug may be effected.

Flexible smooth-surface rugs are particularly subject to injury along the marginal portions thereof. In handling and using such rugs they are frequently subjected to strains which result in tears running inwardly from the edge. Moreover, rugs which have been in use for considerable time often have the surface layer of wear-resistant and decorative material chipped or scuffed off irregularly adjacent the edge, leaving the edge portion very unsightly. According to the present invention, the resistance of the rug to injuries of this character is greatly increased.

In order to afford an understanding of this invention, it will be described in connection with certain illustrative embodiments thereof shown in the accompanying drawings and further purposes, features and advantages of this invention will be apparent from the following description of this invention and of the embodiments thereof shown in the drawings, wherein—

Figure 1 is a plan view of a flexible smooth-surface rug embodying this invention;

Fig. 2 is a side sectional view of the marginal portion of a flexible smooth-surface rug embodying this invention;

Fig. 2A is a side section of a portion of a rug to which this invention is applicable;

Figs. 3, 4, 5 and 6 are side sectional views similar to Fig. 2 but of different modifications of this invention;

Fig. 7 is a side sectional view of a marginal portion of a rug prior to being treated according to this invention;

Fig. 8 is a side sectional view of a marginal portion of the rug shown in Fig. 7 with a diagrammatic representation of means for trimming the edge of the rug;

Fig. 9 is a side sectional view of the rug with a diagrammatic representation of means for slitting the edge of the rug;

Fig. 10 is a plan view of the structures shown in Fig. 9;

Fig. 11 is a side sectional view of the rug with a diagrammatic representation of means for introducing an adhesive into the recess in the edge of the rug;

Fig. 12 is a plan view of the structures shown in Fig. 11;

Fig. 13 is a side sectional view of the rug with a diagrammatic representation of means for introducing a tear-resistant element into a recess in the edge of the rug;

Fig. 14 is a plan view of the structures shown in Fig. 13;

Fig. 15 is a side sectional view of the rug with a diagrammatic representation of means for compressing the marginal portion of the rug;

Fig. 16 is a side sectional view of the rug with a diagrammatic representation of means for compressing and imparting curvature to the marginal portion of the rug;

Fig. 17 is a side sectional view of the rug with a diagrammatic representation of an alternative means for imparting curvature to the margin of the rug;

Fig. 18 is a plan view of the structures shown in Fig. 17;

Fig. 19 is a side sectional view of the rug with a diagrammatic representation of means for cutting off a portion of the base sheet of the rug and for maintaining the curvature of the margin of the rug;

Fig. 20 is a plan view of the structures shown in Fig. 19;

Fig. 21 is a side sectional view of the rug with a diagrammatic representation of means for applying a coating composition to the margin of the rug; and Fig. 22 is a side sectional view of the rug with a diagrammatic representation of alternative means for cutting away a portion of the base sheet of the rug.

A preferred embodiment of this invention is shown in Figs. 1 and 2. The rug is indicated generally by the reference character 30 and consists of a base sheet 31 of felt impregnated with a waterproofing material. By "waterproofing material" any material which is adapted to impart increased resistance to water of the fiber in the base is referred to. A bituminous material of an asphaltic character is usually desirable, although other waterproofing materials such as bodied drying oils, soluble cellulose compositions, solutions of synthetic resins or the like, may be used. Integral with the upper side of the felt base sheet is a wear-resistant and decorative layer 32. In this modification and in the other modifications of this invention herein described, the surface layer such as layer 32 may consist of a sealing coat 34 and a wear-resistant coating or layer 33, as shown in Fig. 2A. Moreover, a suitable backing coat 41 may be employed as also shown in Fig. 2A. Hereinabove, mention has been made of suitable materials which may be used in such portions of the wear-resistant and decorative surface layer and in the backing coat. In the drawings other than Fig. 2A, e. g., in Fig. 2, the decorative and wear-resistant surface layer is shown as a single layer, but it is to be understood that this is done for convenience and clarity in the drawings and that the decorative and wear-resistant layer such as the layer 32 may comprise one or more coatings as may be desired and may include coatings of different materials. Likewise, it is understood that the modifications shown in the drawings may include a backing coating applied in one or more layers of the same or different materials, although, for convenience in description and clarity in the drawings, this backing layer is omitted. The decorative and wear-resistant layer may include a desired design such as the design 35, part of which is shown in Fig. 1. A rug such as that described is usually made so as to be about .05 to .08 inch in overall thickness, the belt base being about .04 to .06 inch in thickness.

The base sheet has a recess or slit 36 therein intermediate its thickness which penetrates a substantial distance laterally into the sheet adjacent the edge thereof such recess being approximately coextensive with the lineal dimension of the edge. Completely embedded in and approximately coextensive with the recess is an elongated tear-resistant element 37 that is thin relative to the thickness of the sheet in which it is embedded. The tear-resistant element is preferably metallic and is preferably flat, namely, has substantially less thickness than width and may comprise a flat, narrow band of flexible and rust-resistant metal having high tensile strength. Moreover, when a flat tear-resistant element is used, it is distinctly preferable to have it disposed flatwise with reference to the flatwise disposition of the rug in the manner shown in Fig. 2. The tear-resistant element is preferably at approximately the neutral axis of the rug, namely, at the plane of the rug which is intermediate the thickness thereof and at which the material of the rug is neither stretched substantially nor compressed substantially upon flexing the rug.

In order to afford an example of a tear-resistant element which is preferably used in a rug of the character referred to above, the following may be cited as typical. The tear-resistant element is a wire of stainless steel having a tensile strength of about 200,000 pounds per square inch and comprising about 18% chromium and about 8% of nickel. The wire is initially made round with a diameter of about .018 inch and is flattened by rolling to a thickness of about .010 inch. It weighs about .001 pound per linear foot. If the wire is used without flattening, the diameter thereof is preferably not greater than about .015 inch. The thickness of the tear-resistant element perpendicular to the plane of the rug is preferably not more than about half of the thickness of the sheet in which it is embedded and for a rug having a base sheet of impregnated felt and a decorative and wear-resistant surface layer of the character referred to above by way of example, the thickness of the tear-resistant element perpendicular to the plane of the rug preferably should not be more than about one-third of the rug thickness. When a wire is used, the gauge of the wire perpendicular to the plane of the rug usually is about one-fifth to one-seventh of the overall thickness of the rug. Thus, for example, for use in a rug having an overall thickness of about .06 inch, a typical tear-resistant element will consist of a stainless steel wire or tape having a gauge perpendicular to the plane of the rug of about .01 to .012 inch. Preferably in a rug of such character, the thickness of the tear-resisting element perpendicular to the plane of the rug is not greater than about .02 inch.

The tear-resistant element as disposed in a rug intermediate the thickness of the sheet in which it is embedded does not substantially increase the thickness of the rug adjacent the tear-resistant element and preferably does not substantially increase the thickness of the sheet in which it is embedded. By this construction the marginal portion of the rug is reinforced against tearing while affording a rug which will lie flat on the floor without surface bulges that would tend to impair the wearing qualities of the rug along the margin.

The opposed faces of the recess 36 are maintained in juxtaposition by a water-resistant adhesive 42. Preferably such adhesive will be of the thermoplastic type, fluid at elevated temperatures but adapted to harden quickly upon cooling to a tough flexible film that will not become embrittled with age. Furthermore, it should possess such viscosity when heated or such miscibility with the waterproofing material in the felt body as not to be absorbed excessively into such felt. Selected bituminous and pitch compounds, synthetic resins, as for example, the alkyd resins, paracoumarone resin, chlorinated rubber, natural resins, as for example, ester gum, or various mixtures thereof with or without solvents, have been found satisfactory as adhesives for the purposes of this invention. An example of a preferred adhesive is as follows:

| | Parts |
|---|---|
| Phenol modified alkyd resin (plastic solid at 75° F.—fluid at 200° F.) | 50 |
| Chlorinated rubber (130 C. P.) | 7 |
| Paracoumarone resin (M. P. 80° F.) | 43 |
| | 100 |

In the modification shown in Fig. 2, the base sheet 31 is tapered along the margin thereof, such tapered portion decreasing in thickness and increasing in density progressing toward the edge. As will be described more in detail below, this tapering is preferably accomplished by pressure. Preferably the base sheet is tapered so as to be at most only about one-third as thick at the edge as in the body of the rug, although lesser amounts of taper such as results from having the base sheet only half as thick at the edge as in the body portion likewise afford advantages according to this invention. Preferably the tapered portion is not more than about twice as wide as its maximum thickness. Over the tapered marginal portion of the base sheet, the surface layer 32 is caused to include a curved or bent portion 40, which curves or bends downwardly from the plane of this layer in the body of the rug. Preferably the curved portion curves continuously and is in the form of a parabola with the greatest curvature at the edge. The recess 36 in preferred practice may be about one-fourth to three-fourths inch in depth and curves downwardly to some extent and may terminate in the edge of the base sheet or in the bottom of the base sheet adjacent the edge of the base sheet, and in either event the slit is regarded as being in the edge portion of the base sheet.

A rug of the character above described has many advantages, some of which may be mentioned as follows: By the use of the elongated tear-resistant reinforcing element, the rug is given positive protection against tearing from the edge inwardly into the body of the rug. The use of a thin tear-resistant element that is flexible enables the rug to be easily rolled for shipment and storage. Further, the placing of the tear-resistant element at approximately the neutral axis of the rug enables the rug to be rolled without producing waves in the margin of the rug due to strains set up by the tear-resistant element, and prevents any such strains from weakening the structure of the rug. The use of a flat tear-resistant element disposed flatwise in the margin of the rug contributes to giving increased resistance to scuffing and chipping at the margin, but what is even more important, a flat band of metal has been found to have higher strength in preventing tearing of the rug than a wire which is of the same material and weight per unit length but which is round. By having the tear-resistant element thin, relative to the thickness of the rug and to the sheet in which it is embedded, the marginal portion of the rug is reinforced against tearing and at the same time is constructed so that when the rug is placed on the floor the surface will lie flat and without any bulge or other increase in thickness adjacent the tear-resistant element that would tend to impair the wearing qualities of the rug along the margin.

Further improvements likewise result from having the marginal portion of the surface layer, curved downwardly toward the edge of the rug, inasmuch as the marginal portion of the rug has its resistance to chipping or scuffing greatly increased as compared with rugs heretofore manufactured wherein the edge of the body portion of the rug is formed merely by trimming the edges to give a square corner at the surface. Rugs wherein the surface layer has a downward curve according to this invention have been subjected to service tests in comparison with rugs having a square corner at the surface along the edge and have exhibited greatly diminished tendency of the surface layer to chip off along the edge. As this is one of the most serious defects in rugs of this character, this improvement is of much practical value.

In addition to affording greater resistance to chipping at the edges, the tapering of the edge gives an improved appearance to the rug. The curving of the decorative and wear-resistant layer imparts a more finished appearance to the rug and largely eliminates the visibility of the edge portion of the unsightly base sheet. The matter of improved appearance is important from the point of view of affording an article that is attractive to purchasers.

When the marginal portion is tapered as above mentioned, the resistance to tearing may be slightly decreased at the edge. On the other hand, the tear-resistant element more than counteracts the weakening of the edge due to the tapering. Thus it is preferable to employ a tapered portion in combination with an elongated tear-resistant element, in order to impart maximum durability to the rug.

By having the base sheet of the rug in the form of a single sheet of felt impregnated with a waterproofing material (as distinguished from two or more overlying layers joined together by an adhesive) and by forming a recess in the edge of the single base sheet, the advantages of a tear-resistant element along the edge of the sheet is afforded while avoiding the likelihood of damage resulting from the delamination, throughout a substantial area, of such layers. Further, a stronger construction is afforded when the tear-resistant element is embedded in a recess in the edge of a unitary sheet as distinguished from being sandwiched between two separate sheets. Moreover, by embedding a flexible tear-resistant element in the edge of a unitary sheet the desired strength can be obtained in a rug structure which is unimpaired as to flexibility, and which is lighter and less expensive to manufacture than when the tear-resistant element is sandwiched between two layers of material joined by an adhesive. It is not, however, regarded as essential to certain of the other features of this invention that the base layer be of unitary construction.

In Fig. 3, a modification of a rug embodying this invention is shown which omits the tapering of the marginal portion of the base sheet and the rounding or curvature of the wear-resistant and decorative surface layer along the margin. In other respects, the elements of the structure correspond to those shown in Fig. 2 and are indicated by like reference characters. In this modification, the advantages of using a tear-resistant element embedded in a recess in the edge of a unitary sheet are afforded as are likewise the advantages resulting from a flat tear-resistant element positioned flatwise in the rug at about the neutral axis of the rug.

In Fig. 4, a rug structure is shown which is identical with that shown in Fig. 2, except that the tear-resistant element 43 is round instead of flat. For example, the tear-resistant element is a round metal wire which is flexible and has a high tensile strength. The tear-resistant element may have other cross-sectional dimensions, e. g., the tear-resistant element may be of oval cross-section. The tear-resistant element likewise may be flat on the upper and lower surfaces and rounded or bulging at the sides as would be the case when a tear-resistant element is initially made having a round cross-section and thereafter is flattened by the application of pressure to the upper and lower surfaces thereof. In the usual case, it is preferable to use a metal tear-resistant element. However, certain advantages of this invention can be gained by using a tear-resistant element made of some material other than metal. For example, a cord or tape of fibrous material and having a high tensile strength may be used in certain embodiments of this invention.

In Fig. 5 a rug is shown which is similar to that shown in Fig. 2, except that the wear-resistant and decorative surface layer is relatively heavier in relation to the layer. For example, the surface layer 44 may comprise linoleum composition which is integral with the base sheet 31 and which has rounded portion 40 along the margin thereof. The layer of linoleum composition may, for example, be about .04 to .05 inch in thickness and may be used in bonded relation with an impregnated felt base about .04 to .06 inch in thickness to afford a floor covering having an overall thickness of .08 to .11 inch in thickness.

In Fig. 6 a rug is shown which, like the rug shown in Fig. 2, includes a base sheet 31 of felt impregnated with a waterproofing material and a decorative and wear-resistant surface layer 32 which has curved portion 40 along the margin thereof. The margin of the rug has the tear-resistant element 37 in the base of recess 36 the faces of which are caused to adhere to each other by adhesive 42. In this modification the tapered portion of the base sheet instead of being of decreased thickness and increased density progressing toward the edge decreases in both thickness and weight progressing toward the edge. This difference in the marginal portion of the base sheet may result from certain differences in method of manufacture. As will be described more in detail below, this is preferably accomplished by cutting away some of the base sheet along the edge so that the marginal portion of the base sheet will be decreased in both thickness and in weight progressing toward the edge of the marginal portion, namely, in a direction toward the edge of the rug. Over the tapered portion of the base sheet, the surface layer 32 comprises the curved or bent portion 40. When the surface of the rug is bent downwardly along the margin thereof, the faces of the recess are somewhat sheared from their normal position (i. e., their relative registered position prior to deformation) and preferably are united and maintained by the adhesive in such unregistered relation with respect to each other. Thus the face of the recess on the portion of the base below the recess is sheared toward the edge of the rug relatively to the face of the portion of the base above the recess. Uniting the faces of the recess in unregistered position tends to maintain the curvature of the surface of rug above the recess. Along the edge portion of the rug, both underneath and extending up to layer 32, is a coating 39 of protective coating composition having some suitable base such as a soluble cellulose derivative, a drying oil or the like. The modification shown in Fig. 6, as contrasted to the modification shown in Fig. 2, has somewhat decreased resistance to tearing between the edge of the rug and the tear-resistant element, but, in the modification shown in Fig. 6, the curvature of the surface layer can be made more pronounced and more permanent.

Features of this invention also relate to certain steps employed in making flexible smooth surface rugs which embody improvements of the character hereinabove referred to. By way of example, a rug to which the method of this invention is applicable, may be made by first forming a sheet of felted fiber as, for example, by some known process of making felt from an aqueous furnish to form a water-laid felt sheet. The felt is then impregnated with a waterproofing material such as a bituminous saturant having a softening point of about 160° F. One or more sealing coats are applied directly to the impregnated felt base sheet. The sealing coat may be of any desired composition such as referred to hereinabove, and when two or more coats are applied, the different coats may be of the same or different compositions. Applied over the sealing coat or coats and on the side thereof remote from the base sheet, a decorative and wear-resistant layer or coating is applied which is made of some paint, lacquer, or moldable composition such as those hereinabove referred to. The back of the rug is coated with some suitable protective coating material which may, for example, be similar in composition to the composition of the sealing coat. Such a method of manufacture may be employed in making a rug of the character shown in Fig. 2A, for example. However, for purposes of convenience and clarity in the drawings, such a rug is to be regarded as illustrated by the rug shown in Fig. 7 which is shown as comprising the base sheet 50 and decorative and wear-resistant surface layer 51. Moreover, other methods may be used for forming a smooth surface rug structure or body comprising a base sheet and a decorative and wear-resistant surface layer, and it is to be understood that the base sheet and surface layers may be made of any desired and appropriate materials assembled in any desired way to afford a flexible smooth-surface rug.

A preferred method of manufacturing a flexible smooth-surface rug will be described in connection with Figs. 7 to 16. In Fig. 7, a marginal portion of a smooth-surface rug is shown as originally made up and before it has been trimmed as evidenced by the rough edge. The rug is then trimmed by cutting off a portion along the edge of the rug as by means of some suitable knife or guillotine 52 which is adapted to give the rug a clean-cut and regular edge portion 53, as shown in Fig. 8.

In making a rug having the improvements hereinabove referred to, the edge 53 of the rug is subjected to a slitting operation by means of a suitable cutting device, such as shown in Figs. 9 and 10, leaving the opposed faces of the recess approximately in juxtaposition. The slitting operation is shown as being performed by a knife 54 which makes a slit or recess 55 in the edge 53 of the rug. The rug is then subjected to an operation wherein there is introduced into the recess 55 in fluid form some water-resistant adhesive such as an adhesive of the character above mentioned which is adapted to harden to bond the faces of the slit together again and maintain them in juxtaposition. For this purpose, any suitable device, such as the device shown in Figs. 11 and 12, may be used comprising an injector 56 which is adapted to be inserted in the slit and which has a conduit 57 therein that is adapted to discharge the adhesive adjacent the end of the injector so as to leave a substantial amount of adhesive 58 within the slit.

Before the adhesive has had a chance to fully harden, an elongated tear-resistant element such as the flat wire 59 is embedded in the recess 55. As shown in Figs. 13 and 14, this may be done by feeding the wire by means of feed rolls 60 into the recess 55 from a suitable reel 61 at a rate corresponding to the rate of movement of the rug, the wire being positioned at the base of the recess by means of any suitable device such as the shoe 62.

If, in the practice of this invention, it is desired to make a rug without curvature along the margin thereof, the rug may, for example, be subjected to the operations hereinabove described and illustrated in connection with Figs. 7-14. After the tear-resistant element 59 has been embedded in the recess 55, the margin of the rug can be passed between rollers 95 and 96 which are adapted to compress the faces of the recess 55 together as illustrated in Fig. 15 and the resulting structure may correspond to that shown in Fig. 3, for example. The pressure is sufficiently great so that the opposed faces of the recess are pressed together between the wire and the mouth of the recess and so that the felt about the wire embedded in the recess is compressed leaving the felt sheet and the rug body without substantial increase in thickness adjacent the wire.

It is preferable, as hereinabove stated, to taper the marginal portion of the rug and to impart a downward curvature to the surface layer 51 along the margin as by application of pressure. This may be accomplished, for example, in the manner illustrated in Fig. 16. To this end, the margin of the rug may be compressed between two rollers, namely, roller 83, which is underneath the rug, and roller 84 which has a concave periphery corresponding to the curvature that is desired in the margin of the rug. This pressure has the further effect of pressing the faces of the recess 55 together so as to improve the bond between these faces which is afforded by the adhesive. Preferably use of the rollers shown in Fig. 16 follows use of the rollers shown in Fig. 15, and, if desired, additional rollers with same or intermediate degrees of curvature may be used. After this operation, the margin of the rug assumes a structure such as that shown in Figs. 2, 4 or 5, for example.

When it is desired to curve the surface layer 51 downwardly along the margin and at the same time cut away a portion of the base sheet so that it will be tapered, this may be accomplished in any desired way such as in the manner shown in Figs. 17 to 20. After the rug has been subjected along the margin to the operations shown in and described in connection with Figs. 7 to 14, the rug is positioned relatively to a support 63, so as to have the marginal portion which includes the recess 55 overlying the edge of the support 63 as shown in Figs. 17 and 18. The marginal portion of the rug is then curved downwardly by the rollers 64, 65 and 66 having concave peripheral surfaces which conform to the curvature that is desired to impart to the margin of the rug. Preferably, the different portions of the curved margin are acted upon by the rollers in sequence. The rollers 64, 65, and 66 exert sufficient pressure on the margin of the rug to press together the opposed faces of the recess and to compress the felt sheet above and below the tear-resistant element leaving the rug body and preferably also the felt sheet without substantial increase in thickness adjacent the tear-resistant element. During the bending operation, the presence of the recess 55 in the edge of the base is of great value in permitting a high degree of curvature to be imparted to the upper surface without injuring or reducing the thickness of the decorative and wear-resistant surface layer due to the fact that the neutral axis of the portion of the rug which remains integral with the surface layer beyond the base of the recess is brought much nearer the surface layer, with the result that the strain on, and tendency to crack of, the surface layer are greatly diminished. Moreover, it is preferable to have some material in the recess which acts as a lubricant during the bending operation and for this reason it is desirable to carry out the bending operation before the adhesive fully hardens and while it is still sufficiently liquid to act as a lubricant so that the faces of the recess 55 may readily slide relatively to each other during the bending operation. During the bending operation, the faces of recess 55 are, of course, pressed together and to some extent the marginal portion of the base sheet is consolidated and compressed.

In order that the bottom surface of the rug may lie flat on a subsurface and still maintain the curvature which has been imparted to the surface layer, the base sheet is subjected to a cutting operation, which cuts off a part of the base sheet along the margin of the rug and underneath the recess. The cutting may be accomplished in any desired way, such as that illustrated in Figs. 19 and 20. While the margin of the rug overhangs a support, e. g., the support 63, it is caused to pass in operative relation with respect to a suitable cutting device such as the rotary knife 67 which cuts off the portion of the rug that has been bent downwardly below the bottom surface of the rug. The cutting is preferably at such point that the rug after its completion will lie flat on a subsurface along the margin thereof and preserve a desired amount of curvature in the surface layer of the rug along the margin. In order to maintain the rug in the desired position during the cutting operation, a moving belt 68 may be used having a curvature conforming to the curvature of the margin of the rug, which belt is kept is proper spaced relation with respect to support 63 by fixed shoe 69. The curved belt, or other equivalent device, is also useful in maintaining the curved position of the margin of the rug over an interval of time sufficient to permit the adhesive in the recess 55 to set and bond the faces of the recess together.

It is desirable to coat the portion of the bottom and edge of the rug which has been subjected to the cutting operation above described. This may be done in any suitable manner. For example, as illustrated in Fig. 21, the rug while projecting over a suitable support or shield 70, may come into operation relationship with a spray device 71, which sprays a suitable lacquer 72 along the edge portion of the rug. This lacquer may be any quick-drying and flexible lacquer, such as a lacquer having a soluble cellulose ester base, e. g., cellulose nitrate. Alternatively, a lacquer can be used which is prepared from a drying oil by oxidizing the drying oil and then removing from the oxidized oil those constituents which were non-hardening or unoxidized or both, so that the composition can dry merely by evaporation of solvents in which the oxidized fluid oil components are dissolved. Such marginal finishing coat is effective to prevent the marginal portion of the rug from sticking to a subsurface on which the rug may be laid, affords a seal at the end or mouth of the recess 55, and gives the marginal portion of the rug an improved appearance. Furthermore, such coating may be of a composition to give it the property of shrinking upon drying, this property also being effective in causing the tapered edge portion to curve downward and the bottom of such edge portion to lie flat on a subsurface.

After a rug which has ben subjected to the process above described and illustrated in connection with Figs. 7 to 14 and 17 to 21, it may, for example, be of the type hereinabove described in connection with Fig. 6.

An alternate way of making the rug according to this invention, with part of the base layer 50 cut away, may be illustrated in connection with Fig. 22 when taken with Figs. 7 to 15. The rug may be made up initially and trimmed along an edge and thereafter the edge may have a recess formed therein which first has an adhesive introduced therein and thereafter has a tear-resistant element embedded therein as described above and illustrated in connection with Figs. 7 to 15. Thereafter the margin of the rug may be subjected to a cutting operation wherein a portion of the base sheet adjacent the edge thereof is cut away in some suitable manner such as that illustrated in connection wtih Fig. 22. To this end, the rug which, as aforesaid, comprises the base sheet 50 and the surface layer 51 is moved between a suitable support 80 and a guide member 81. The under side of the margin of the rug is cut off diagonally by means of any suitable device such as the rotary knife 82. A rug which has been subjected to such an operation could be used immediately and in use would tend to have the margin become bent down along the edge so as to approach an ultimate structure along the margin analogous to that shown in Fig. 6, for example. It is preferable, however, to follow the cutting operation by a compression operation wherein the margin of the rug is bent or curved downwardly. This may be done in any suitable way, such as that illustrated in connection with Fig. 16 which has been described hereinabove. In such case, the roller 84 would be set somewhat closer to the roller 83 than when none of the base sheet 50 is cut away. In this manner, the margin of the rug can be subjected to pressure which presses the faces of the recess 55 together and at the same time bends the upper surface of the rug downwardly. A rug thus made assumes a structure corresponding to that shown in Fig. 6, for example.

The method just described, namely, in connection with Figs. 22 and 16 accomplishes tapering of the marginal portion of the base sheet by combining cutting away of a portion of the base sheet, with positive compression of the base sheet along the margin. In such operation and in the operations illustrated in connection with Figs. 17 to 20, it may be noted that the face of the recess 55 on the portion of the base underneath the recess is sheared toward the edge of the rug relatively to the face of the recess on the portion of the base above the recess during the bending operation. The faces of the recess are maintained in their non-registering position by means of the adhesive interposed between the faces.

In carrying out the modified method which has been illustrated in connection with Figs. 22 and 16, a final operation, whereby a lacquer is applied to the margin of the rug, can be availed of if desired. Such an operation has been described above and illustrated in connection with Fig. 21. Moreover, this operation can be availed of in connection with rugs embodying this invention which do not have a portion thereof cut away (e. g., of the type shown in Figs. 2 and 3) although such an operation is of decreased importance in connection with these modifications inasmuch as in the manufacture thereof there is no cutting away of a portion of the bottom of the rug so as to expose an uncoated under surface of the base sheet of the rug.

In any or all of the foregoing operations or steps, the rug may be moved relatively to devices adapted to act upon the marginal portion of the rug as indicated in the drawings, or the devices which act upon the margin of the rug may be moved relatively to the rug. The steps or operations may be performed on one or more marginal portions of the rug, and in rugs of the common rectangular type it is normally desirable to carry out the operations or steps along each of the four sides of the rug. This is preferably done by treating each of the sides of the rug in succession, although simultaneous treatment of two or more sides of the rug is possible. In inserting a tear-resistant element in the side of a rug, it has been found desirable to introduce the element into a recess at the margin of the rug beginning at a point about one-quarter to three-quarters inches from a corner and carry it continuously along one of the edges of the rug to a point about one-quarter to three-quarters inches from a next adjacent corner. Any suitable means for cutting the tear-resistant element at the proper point to accomplish this result may be employed.

Although preferable, it is not essential in every case to utilize the step wherein an adhesive material that becomes hardened at normal temperature is introduced into the recess, especially when the base sheet comprises a waterproofing material such as a bituminous saturant as the saturant on the faces of the formed recess tends, especially after the faces of the recess have been compressed together, to adhere to some extent to each other. This effect can be augmented by using a heated plow following the recess forming operation, which plow is heated sufficiently to melt the bituminous material at the faces of the recess, the melted bituminous material being more effective in reuniting the faces of the recess than when it is cold. Moreover, bituminous material when melted by the heated plow also lubricates the faces of the recess somewhat so as to facilitate the bending of the marginal portion of the rug after the recess has been formed, in the event that the rug is subjected to such a bending operation.

While this invention has been described in connection with flexible smooth-surface rugs of the type having a decorative and wear-resistant surface layer in addition to a base sheet, many features of this invention are applicable when the wear-resistant and decorative layer is omitted, or when the base sheet itself consttiutes the wear-resistant and decorative surface. Thus many of the features of this invention may be availed of in connection with flexible smooth-surface coverings comprising fibrous material such as felt, impregnated with a waterproofing material, e. g., bituminous material, drying oils, cellulose lacquers, synthetic resins or the like, whether or not the covering has a separate and distinct surface layer or layers integral with one or both surfaces thereof and whether or not the fibrous base sheet may have a decorative design imprinted therein, and the terms "flexible smooth-surface rug" and "rug body" are applicable to any such coverings.

While this invention has been described in connection with certain illustrative embodiments thereof, it is to be understood that this has been done merely for exemplification and that the scope of this invention is to be limited only by the following claims.

I claim:

1. A flexible smooth-surface rug which comprises a unitary sheet of fibrous material impregnated with a waterproofing material and an elongated tear-resistant element completely embedded in and approximately coextensive with an elongated recess penetrating a substantial distance laterally into said sheet adjacent an edge thereof, said recess being approximately coextensive with the lineal dimension of said edge and said tear-resistant element being thin relative to the thickness of said sheet and flexible and being positioned intermediate the thickness of said sheet and surrounded thereby without substantially increasing the thickness of said rug adjacent said element.

2. A flexible smooth-surface rug which comprises a unitary sheet of fibrous material impregnated with a waterproofing material and an elongated tear-resistant element completely embedded in and approximately coextensive with an elongated recess penetrating a substantial distance laterally into said sheet adjacent an edge thereof, said recess being approximately coextensive with the lineal dimension of said edge, the thickness of said element perpendicular to the plane of said sheet being less than half the thickness of said sheet where said element is embedded and said element being flexible and being positioned intermediate the thickness of said sheet and surrounded thereby without substantially increasing the thickness of said rug adjacent said tear-resistant element.

3. A flexible smooth-surface rug which comprises a unitary sheet of fibrous material impregnated with a waterproofing material and an elongated tear-resistant element completely embedded in and approximately coextensive with an elongated recess penetrating a substantial distance laterally into said sheet adjacent an edge thereof, said recess being approximately coextensive with the lineal dimension of said edge, and said tear-resistant element being thin relative to the thickness of said sheet and flexible and being positioned intermediate the thickness of said sheet and surrounded thereby without substantially increasing the thickness of said rug adjacent said element, and said sheet having a marginal portion along said edge which is tapered so as to become substantially thinner progressing toward the edge of said rug.

4. A flexible smooth-surface rug which comprises a unitary sheet of felt impregnated with a waterproofing material, a decorative and wear-resistant surface layer integral with a surface of said sheet, and an elongated metal tear-resistant element completely embedded in and approximately coextensive with an elongated recess penetrating a substantial distance laterally into said unitary sheet of felt adjacent an edge thereof, said recess being approximately coextensive with the lineal dimension of said edge, the thickness of said element perpendicular to the plane of said sheet being not greater than about one-third the thickness of said rug where said element is embedded and said element being flexible and being positioned intermediate the thickness of said sheet and surrounded thereby without substantially increasing the thickness of said rug adjacent said tear-resistant element.

5. A flexible smooth-surface rug which comprises a sheet-like base comprising fibrous material impregnated with a waterproofing material, a decorative and wear-resistant surface layer integral with a surface of said base, an elongated flat metallic tear-resistant element completely embedded flatwise in and approximately coextensive with an elongated recess penetrating a substantial distance laterally into said base adjacent an edge thereof, said recess being approximately coextensive with the lineal dimension of said edge, the thickness of said element perpendicular to the plane of said rug being less than about one-third the thickness of said rug where said element is embedded and said element being flexible and being positioned intermediate the thickness of said base and surrounded thereby without substantially increasing the thickness of said rug adjacent said tear-resistant element.

6. A flexible smooth-surface rug which comprises a sheet-like base including a unitary sheet of felt impregnated with a waterproofing material, a decorative and wear-resistant surface layer integral with a surface of said base, and an elongated tear-resistant element completely embedded in and approximately coextensive with an elongated recess penetrating a substantial distance laterally into said unitary sheet adjacent an edge thereof, said recess being approximately coextensive with the lineal dimension of said edge, the thickness of said element perpendicular to the plane of said base being not greater than about half the thickness of said base where said element is embedded and said element being flexible and being surrounded by said sheet-like base and being positioned at substantially the neutral axis of said rug without substantially increasing the thickness of said base adjacent said tear-resistant element.

7. A flexible smooth-surface rug which comprises a sheet-like base comprising fibrous material impregnated with a waterproofing material, a decorative and wear-resistant surface layer integral with a surface of said base, and an elongated tear-resistant element completely embedded in said base along and adjacent an edge of said base, and approximately coextensive with the lineal dimension of said edge, the thickness of said element, perpendicular to the plane of said rug being not more than about one-third the thickness of said rug where said element is embedded and said element being flexible and being positioned intermediate the thickness of said base and surrounded thereby without substantially increasing the thickness of said rug adjacent said tear-resistant element, and said base including a tapered marginal portion having substantially reduced thickness along said edge.

8. A flexible smooth-surface rug which comprises a sheet-like base comprising a unitary sheet of felt impregnated with a waterproofing material, an elongated tear-resistant element completely embedded in and approximately coextensive with an elongated recess penetrating a substantial distance laterally into said sheet adjacent the edge thereof, said recess being approximately coextensive with the lineal dimension of said edge, the thickness of said element perpendicular to the plane of said sheet being not more than about half the thickness of said sheet where said element is embedded and said element being flexible and being positioned intermediate the thickness of said sheet and surrounded thereby without substantially increasing the thickness of said sheet adjacent said element, said base including a marginal tapered portion having substantially reduced thickness and weight along said edge.

9. A flexible smooth-surface rug which comprises a sheet-like base comprising a unitary sheet of felt impregnated with a waterproofing material, a decorative and wear-resistant surface layer integral with the upper surface of said base, an elongated tear-resistant element embedded in and approximately coextensive with an elongated recess extending a substantial distance laterally into said unitary sheet adjacent the edge thereof and having opposed faces in juxtaposition between said element and the mouth of said recess, said recess being approximately coextensive with the lineal dimension of said edge, the thickness of said element being not greater than about half the thickness of said sheet where said element is embedded and said element being flexible and not substantially increasing the thickness of said sheet adjacent said element, a water-resistant adhesive between said opposed faces of said recess, said opposed faces being maintained in juxtaposition by said adhesive with portions of the opposed faces out of normal registration so that part of the face of the portion of the base below the recess is sheared toward said edge relatively to the corresponding part of the face of the portion of said base above said recess, said base including a marginal tapered portion which becomes of substantially decreased thickness and weight progressing toward said edge, and the portion of said surface layer overlying said tapered portion of said base being bent downwardly progressing toward said edge.

10. A flexible smooth-surface rug which comprises a unitary sheet of felt impregnated with a bituminous saturant, a sealing coat applied directly to the upper surface of said base, a decorative and wear-resistant surface material overlying said sealing coat on the surface thereof remote from said base, an elongated recess extending a substantial distance laterally into said unitary sheet adjacent the edge thereof, an elongated tear-resistant element embedded in and approximately coextensive with said recess so that opposed faces of said recess are in juxtaposition between said element and the mouth of said recess, said recess being approximately coextensive with the lineal dimension of said edge, the thickness of said element perpendicular to the plane of said sheet being not greater than about one-half the thickness of said sheet where said element is embedded, and said element being flexible and not substantially increasing the thickness of said sheet adjacent said element, and a water-resistant adhesive in said recess adapted to maintain said opposed faces thereof in juxtaposition.

11. A method of making a flexible smooth-surface rug which comprises making a rug body including a fibrous sheet impregnated with a waterproofing material, splitting the sheet adjacent an edge thereof to form an elongated recess approximately coextensive with the lineal dimension of said edge and penetrating a substantial distance laterally into said sheet leaving opposed faces of said recess in approximate juxtaposition, inserting an elongated flexible tear-resistant element that is thin relative to the thickness of said sheet in said recess and approximately coextensive therewith, subjecting to compressing the marginal portion of said rug adjacent said edge to press together the juxtaposed faces of said recess between said element and the mouth of said recess and embed said element in said recess intermediate the thickness of said sheet without substantially increasing the thickness of said rug adjacent said element.

12. A method of making a flexible smooth-surface rug which comprises making a rug body including a fibrous sheet impregnated with a waterproofing material, splitting the sheet adjacent an edge thereof to form an elongated recess approximately coextensive with the lineal dimension of said edge and penetrating a substantial distance laterally into said sheet leaving opposed faces of said recess in approximate juxtaposition, inserting in said recess and approximately coextensive therewith an adhesive and an elongated tear-resistant element the thickness of which perpendicular to the plane of said sheet is not more than about half the thickness of said sheet, subjecting to compression the marginal portion of said rug adjacent said edge to press together the juxtaposed faces of said recess with said adhesive therebetween between said element and the mouth of said recess and to embed said element in said recess intermediate the thickness of said sheet without substantially increasing the thickness of said rug adjacent said element.

13. A method of making a flexible smooth-surface rug which comprises making a rug structure including a sheet-like base comprising fibrous material impregnated with a waterproofing material and a decorative and wear-resistant surface layer integral with said base, splitting said base adjacent an edge thereof to form an elongated recess approximately coextensive with the lineal dimension of said edge and penetrating a substantial distance laterally into said sheet leaving opposed faces of said recess in approximate juxtaposition, inserting in the recess thus formed and approximately coextensive therewith an elongated tear-resistant element that is thin relative to the thickness of said sheet, and subjecting the marginal portion of said rug adjacent said edge to a pressing operation which presses the opposed faces of said recess together between said element and the mouth of said recess and embeds said element in said recess without substantially increasing the thickness of said rug adjacent said element and bends the surface layer of said rug downwardly progressing toward said edge.

14. A method of making a flexible smooth-surface rug which comprises making a rug structure including a sheet-like base comprising fibrous material impregnated with a waterproofing material and a wear-resistant and decorative surface layer integral with one side of said base, splitting said base adjacent an edge thereof to form an elongated recess approximately coextensive with the lineal dimension of said edge and penetrating a substantial distance laterally into said sheet leaving opposed faces of said recess in approximate juxtaposition, inserting in said recess thus formed and approximately coextensive therewith an elongated tear-resistant element that is thin relative to the thickness of said sheet-like base, subjecting to compression the marginal portion of said rug adjacent said edge to press together the opposed faces of said recess between said element and the mouth of said recess and embed said element in said recess without substantially increasing the thickness of said rug adjacent said element, and cutting away a portion of said base which is along said edge on the side of said rug remote from said surface layer leaving a marginal portion of said base tapered so as to be thinnest at said edge.

15. A method of making a flexible smooth-surface rug which comprises making a rug structure including a sheet-like base comprising fibrous material impregnated with a waterproofing material and a wear-resistant and decorative surface layer integral with one side of said base, splitting said base adjacent an edge thereof to form an elongated recess approximately coextensive with the lineal dimension of said edge and penetrating a substantial distance laterally into said sheet leaving opposed faces of said recess in approximate juxtaposition, inserting in the recess thus formed and approximately coextensive therewith an elongated tear-resistant element the thickness of which perpendicular to the plane of said base is not more than about half the thickness of said base where said element occurs, and subjecting the marginal portion of said rug adjacent said edge to treatment wherein a marginal portion of said felt sheet which is along said edge in the side of said rug remote from said surface layer is cut away leaving the marginal portion of said base tapered so as to be thinnest at said edge and whereon said marginal portion of the rug is pressed so as to press the opposed faces of said recess together between said element and the mouth of said recess and embed said element in said rug without substantially increasing the thickness of said rug adjacent said element and so as to curve said surface layer downwardly progressing toward said edge.

16. A method of making a flexible smooth-surface rug which comprises making a rug structure including a sheet-like felt base impregnated with a waterproofing material and a decorative and wear-resistant surface layer integral with said base, splitting said base adjacent an edge thereof to form an elongated recess approximately coextensive with the lineal dimension of said edge and penetrating a substantial distance laterally into said sheet leaving opposed faces of said recess in approximate juxtaposition, inserting an adhesive in said recess, inserting in said recess and approximately coextensive therewith an elongated tear-resistant element that is thin relative to the thickness of said base, subjecting the marginal portion of said rug to a pressing operation which presses the opposed faces of said recess together between said element and embeds said element in said recess without substantially increasing the thickness of said rug adjacent said recess and bends the surface layer of said rug downwardly progressing toward said edge, and cutting away a portion of said base which is along said edge on the side of said rug remote from said surface layer leaving a marginal portion of said base tapered so as to be thinnest at said edge.

17. A method of making a flexible smooth-surface rug which comprises making a rug structure including a sheet-like felt base impregnated with a waterproofing material and a wear-resistant and decorative surface layer integral with said base, splitting said base adjacent an edge thereof to form a recess approximately coextensive with the lineal dimension of said edge and penetrating a substantial distance laterally into said sheet leaving opposed faces of said recess in approximate juxtaposition, inserting an adhesive in said recess, inserting in said recess and approximately coextensive therewith an elongated tear-resistant element that is thin relative to the thickness of said base, cutting away a portion of said base leaving the marginal portion of decreased thickness progressing toward said edge, and subjecting the marginal portion of said rug to a pressing operation to press together the opposed faces of said recess between said element and the mouth of said recess and embed said element in said recess without substantially increasing the thickness of said rug adjacent said element and to bend the portion of the surface layer overlying said tapered portion of said base so as to become curved downwardly progressing toward said edge.

18. A method of making a flexible smooth-surface rug which comprises impregnating a sheet of felt with a waterproofing material, applying to one surface of said sheet a sealing coat, depositing a wear-resistant and decorative material on the surface of said sealing coat remote from said felt sheet, applying a backing coat to the other side of said felt sheet, splitting said sheet adjacent an edge thereof to form a recess approximately coextensive with the linal dimension of said edge and penetrating a substantial distance laterally into said sheet leaving opposed faces of said recess in approximate juxtaposition, introducing an adhesive into said recess, introducing into said recess and approximately coextensive therewith an elongated tear-resistant element that is thin relative to the thickness of said sheet, subjecting a marginal portion of said rug along said edge to pressure whereby the opposed faces of said recess are pressed together between said element and the mouth of said recess and said element is embedded in said recess without substantially increasing the thickness of said rug adjacent said element, curving the surface layer along said margin of said rug downwardly progressing toward said edge, cutting away a portion of said felt sheet leaving said marginal portion of said rug tapered so as to be thinnest at said edge, and applying a coating composition to the surface of said felt sheet exposed by said cutting step.

19. A method of making a flexible smooth-surface rug which comprises making a rug structure including a sheet-like base comprising fibrous material impregnated with a waterproofing material, splitting said sheet adjacent an edge to form an elongated recess approximately coextensive with the lineal dimension of said edge and penetrating a substantial distance laterally into said sheet leaving opposed faces of said recess in approximate juxtaposition, introducing into said recess and approximately coextensive therewith an elongated tear-resistant element that is thin relative to the thickness of said sheet, and subjecting the marginal portion of said rug to pressure to press the opposed faces of said recess together between said element and the mouth of said recess and embed said element in said recess without substantially increasing the thickness of said rug adjacent said element and to curve the surface layer of said rug downwardly progressing toward said edge and to compress the portion of said base underlying said surface layer to become tapered so as to have decreased thickness and increased density progressing toward said edge.

FRANK M. ALLEN.